L. R. FERGUSON.
HONEY UNCAPPING MACHINE.
APPLICATION FILED FEB. 20, 1909.
989,138.
Patented Apr. 11, 1911.
3 SHEETS—SHEET 1.
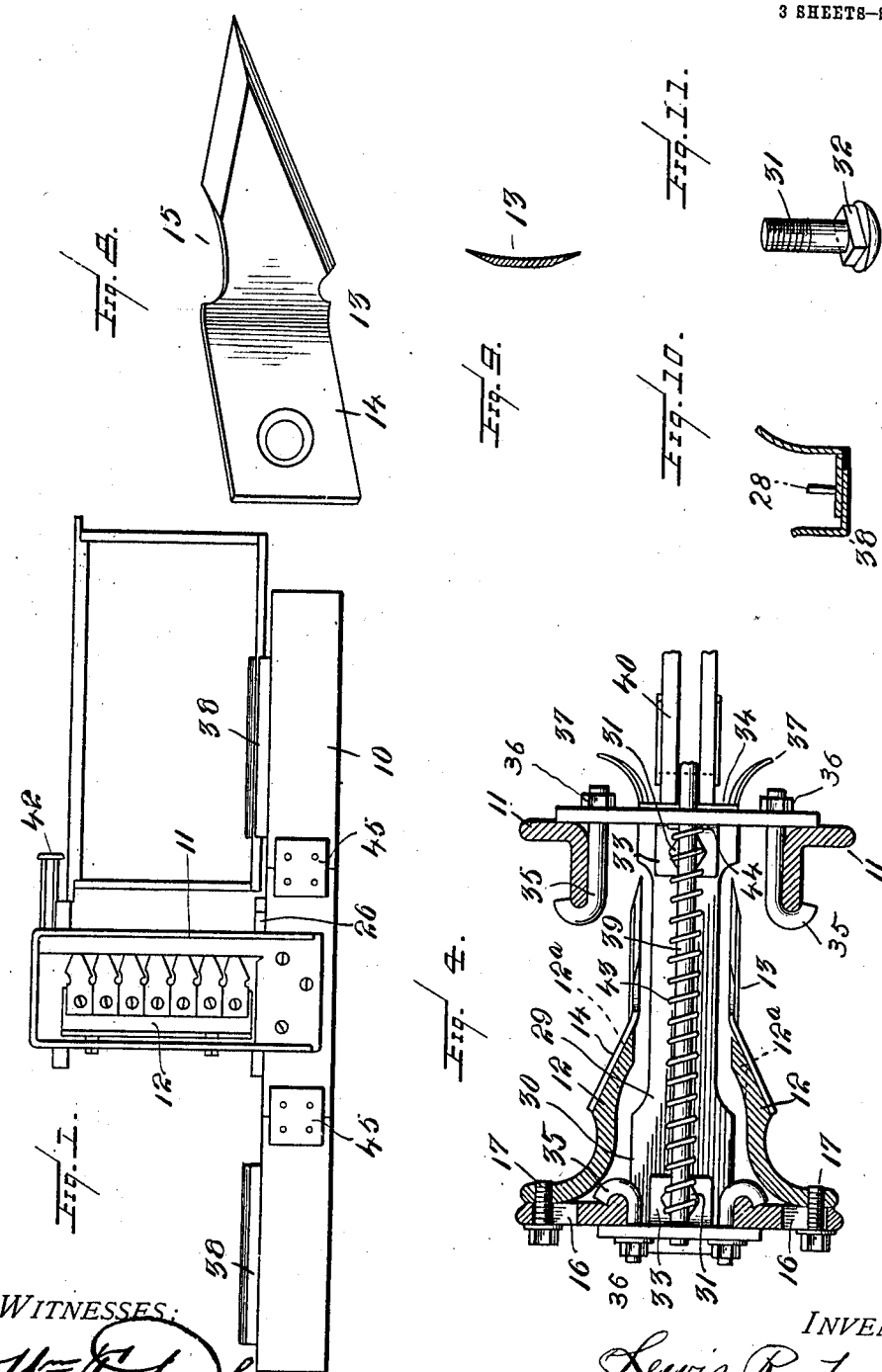
WITNESSES
INVENTOR
Lewis R. Ferguson
BY
Chas. J. Williamson
Attorney

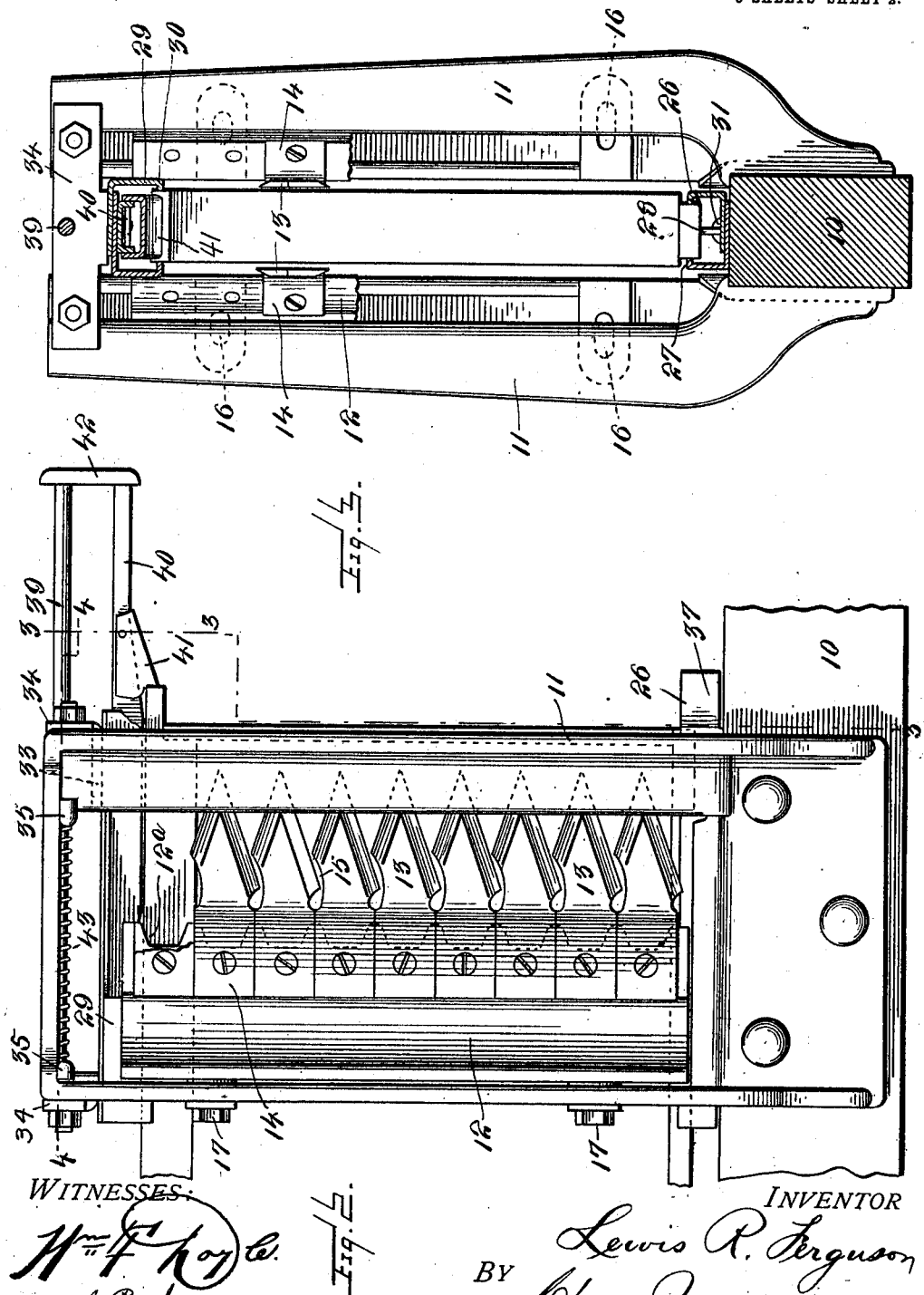

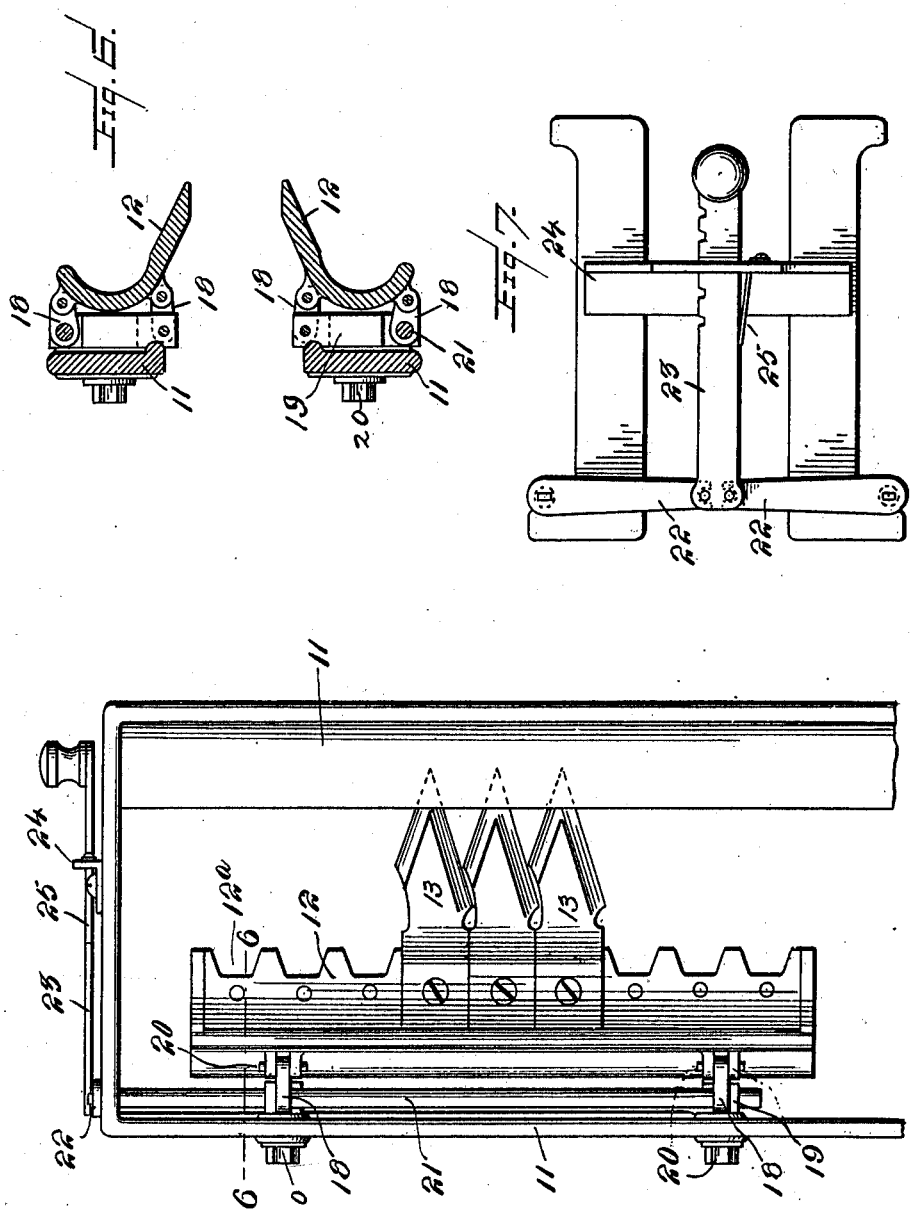

UNITED STATES PATENT OFFICE.

LEWIS R. FERGUSON, OF HARVEY, ILLINOIS.

HONEY-UNCAPPING MACHINE.

989,138.

Specification of Letters Patent.   Patented Apr. 11, 1911.

Application filed February 20, 1909.   Serial No. 479,107.

*To all whom it may concern:*

Be it known that I, LEWIS R. FERGUSON, of Harvey, in the county of Cook, and in the State of Illinois, have invented a certain new and useful Improvement in Honey-Uncapping Machines, and do hereby declare that the following is a full, clear, and exact description thereof.

The uncapping of honey by hand, using the ordinary uncapping knife, is a slow and laborious operation, because each side of the comb must be separately operated on, and in the case of large combs, each side may require several strokes of the knife, and the use of the hand knife imposes a severe strain on the wrist muscles, and if the honey is thick and heavy, the inconvenience of the operation is increased by the necessity of heating the knives. Moreover, the hand work requires a considerable degree of skill, and it is not always possible to secure operators having the required skill. Such machines as I am familiar with that have been used, have been objectionable in that they have been too complicated and costly; power mechanism of some sort has been required to operate them; their operation has been too slow to be economical; and they have been unsatisfactory in the work performed, in that the knives would become clogged with wax and tend to tear and mutilate the face of the comb, and the detached cappings allowed to touch and stick to the uncapped comb, with the result that they would go through the extractor and mix with the honey or clog the wire sides of the extractor comb baskets. In producing my invention, I have had in view the production of a machine which will obviate the objections to hand work and to those machines with which I am familiar which I have mentioned above, to the end that the operation of uncapping honey may be rapidly and easily, and, therefore, economically performed, this desirable end being secured by a machine of simple and inexpensive construction, light and compact, so that it requires but little space, and may be easily carried and transported for use at our apiaries, and which will require no power mechanism to operate it, and which in its operation will call for but little skill.

In the accompanying drawings, Figure 1 is a side elevation of an uncapping machine embodying my invention, arranged for use; Fig. 2 a similar view of a portion of the machine on a larger scale; Fig. 3 a vertical transverse section on the line 3—3 of Fig. 2; Fig. 4 a horizontal section on the line 4—4 of Fig. 2; Fig. 5 a side view of a portion of the machine illustrating a different form of knife-supporting and adjusting means from that shown in the other figures; Fig. 6 a horizontal section on the line 6—6 of Fig. 5; Fig. 7 a detail top plan view of the parts shown in Fig. 5; Fig. 8 a detail view in perspective of one of the knives; Fig. 9 a cross section of the knife blade; Fig. 10 a detail view in cross section of one of the lower comb frame guides; and Fig. 11 a detail view in perspective of the attaching bolt for the upper guide.

It will conduce to a readier understanding of the description of the machine which I have devised to embody my invention, to first explain in a general way that said machine comprises two sets of stationarily supported knives mounted upon a framework such distances apart that a frame of honey may be passed between the two sets and simultaneously the cappings on both sides of the comb sliced off. In said machine, as illustrated in the drawings, I employ a base bar 10, preferably of wood, to the opposite sides of which at midlength thereof are bolted the lower ends of two similar open side frames 11, preferably of cast iron, which of course extend vertically above the base bar 10, and parallel with each other. To one of the vertical side bars of each of said side frames 10, is screwed or bolted a vertical bar 12, to the outer side of which is attached a vertically extending series of knives 13, each knife consisting of a straight shank 14, and a pointed two-edged blade. The knives are placed with their shanks edge to edge and each knife has its own attaching screw. One edge of the knife blade is shorter than the other, and the long and short edges of adjacent knives of the series are contiguous and extend in lines that intersect, so they overlap the same portion of the comb in a cutting operation. A slight space is left between the edges of two contiguous knives in rear of the point of termination of the short cutting edge, which is enlarged by a notch 15, contiguous to the shank of the knife. In consequence of the relative and overlapping arrangement of the cutting edges of contiguous knives, a complete severance of all the cappings is assured, and an escape provided for any loose particles of wax which will work rearward through the space between the knives and fall out of the way through the enlargement at the rear end of such space, so that any clogging of the knives, and consequent injury to the comb, due to loose or detached pieces of wax is avoided. On their sides or surfaces next to the comb, the knives are hollow or concave to prevent any suction action, and also to reduce friction by reducing the area or surface in contact, and in order to secure this advantage, and at the same time to add strength to the knives, this dishing of the surfaces next the comb is secured by bending the stock or material from which the knives are made, so that in cross section they are concavo-convex. By reason of their slim pointed form, the knives readily enter beneath the cappings, and as a result of the inclination of their cutting edges, they work with a draw or shear cut, so that the labor or effort required to cut the cappings from the comb is not great, and the cappings are most cleanly and advantageously removed, the cappings in fact being severed in a continuous sheet that as fast as cut from the comb is pressed away therefrom and maintained out of contact therewith, so that all danger of pieces of wax getting into the honey is obviated. I prefer that the knives shall have two cutting edges, but if desired knives with a single cutting edge may be used, but preferably the other characteristics of the knives that I have described will be retained.

Some comb frames have on their sides nails, staples, or other frame-spacing devices. To provide for the passage past the knife bars of such spacing devices, the knife bars are provided on their inner sides with horizontally extending grooves or notches 12$^a$ which permit the passage of such spacing devices.

The knife-carrying bars are adjustably supported to enable the knives to be adjusted in a direction toward and from each other, according to the requirements of the honey comb being operated upon. Provision for such adjustment may consist, as shown in Figs. 2, 3 and 4, in a bolt and slot connection between the knife-carrying bar and the side bar of the frame side 10, the latter being provided with a horizontally elongated slot 16 for the passage of the fastening bolt 17. Another means of adjustment is shown in Figs. 5, 6 and 7. In this case, each knife-carrying bar is pivotally connected near its upper and lower ends by a pair of parallel links 18, to a bracket or block 19, which is secured by a bolt or screw 20 to the side bar of the side frame 11, and the vertically alining links at the same side of the bar are secured to a vertical rod or shaft 21, whose upper end is flattened or squared, and on the flat or squared portion is secured a crank arm 22 whose free end is pivotally connected to one end of an operating bar or handle 23 that passes through a slot in the bracket 24, extending across and secured to the tops of the two side frames 11. In one side, said operating handle or bar is provided with a series of notches pressed yieldingly, by means of a spring 25 on the opposite side, in engagement with the contiguous edge of the slot. It will be seen that by longitudinal movement of the operating handle, both the knife bars will be simultaneously moved, and the knives may be held at the desired point of adjustment by means of the appropriate one of the locking notches.

Upon the upper side of the base bar 10, and extending between the side frames 11, is a frame guide or track 26 that is trough-shaped in cross section, and has at the top on each side an inwardly projecting rib or flange 27 to engage the bottom bar of the frame on opposite sides, and midway between the sides has a vertical rib or flange 28 upon the upper edge of which the bottom of the frame bar rests. It will be seen that thus there are virtually mere points of contact between the frame bar and the guide, the purpose of which is to afford an easy passage through any bur combs or collections of wax which might be on the bottom bar of the frame. Said track or guide is preferably made of sheet metal. The top bar of the frame is likewise guided by a similar track or guide 29 that is trough-shaped in cross section, and which has ribs or flanges 30 at its bottom that have limited contact with the opposite sides of the top bar of the frame, but which has no mid rib or guide corresponding to the rib 28 of the lower track or guide. Both guides are made in two parts or halves, with overlapping base or bottom portions, and they are secured in place by screws or bolts 31 which pass through slots in the overlapping portions that permit movement of the opposite sides of the track or guide toward and from each other to suit comb frames of varying thickness. In the case of the upper track or guide, each of the supporting bolts passes through an ear or lug 33 on a cross bar 34 that extends from the top of one side frame 11 to the top of the other side frame 11, and is securely clamped thereto by means of a hooked bolt 35 and nut 36 thereon. I employ the hook-formed bolts 35 because they afford a very convenient connection to enable the easy vertical adjustment of the upper guide to suit the machine for use with comb frames of varying height, and in order to enable the upper guide to be lowered below the level of the uppermost knives, the side portions of the upper guide are cut away sufficiently to enable them to clear the knives and such portions of the knife-carrying bars as otherwise might hinder or prevent the vertical adjustment of the upper guide.

To facilitate the entrance of the comb frame between the guides or tracks, the side of each guide or track at the entering end is bent or flared outwardly, as indicated at 37. Besides the guide or track 26 situated between the side frames 11, I prefer to use a supplemental guide or track on the upper side of the base bar 10, on either side of and in alinement with said guide or track 26, and the supplemental guide or track 38, which is designed to receive the comb frame before it is moved between the knives, has its side walls outwardly and upwardly flared to facilitate the insertion of the bottom bar of the frame therein, and one of said side walls is carried higher than the other to further facilitate the operation of placing a frame in position therein.

The comb frame is pushed between the knives as far as is possible merely by the direct engagement of the hand with the frame, and to complete the passage of the comb frame through the knives, I provide a pusher or follower that consists of a pair of parallel horizontal bars 39 and 40, the upper bar 39 being preferably a round bar that passes through alining openings in the cross bars 34, and the lower bar 40 being of sheet metal of inverted U-shape in cross section, and slotted to pass over the upper guide-supporting bolts 31. The latter, contiguous to their heads, have straight enlargements or shoulders 32 that receive the slot of the bar 40, and which though tightly binding the guide, leave said bar 40 free to move easily. Pivoted to the lower bar is a dog or pawl 41 which is adapted to engage the rear end of the top bar of the comb frame when the pusher is moved in the direction required to force the comb frame onward between the knives. The upper and lower bars 39 and 40 are connected at their rear ends by a handle-forming bar 42. A coil spring 43 applied to the upper bar 39 between the frame cross bar 34 and bearing at one end upon the latter, and at the other end upon a pin 44 in said bar 39, returns the pusher to its retracted position after it has been used to force a comb frame between the knives.

It will be understood that the dog or pawl 41 when the comb frame is pushed against it will rise out of the path of the advancing frame and there will be no premature onward movement of the pusher, due to any contact therewith of any bur combs or collections of wax or propolis on the top of the comb frame, and as soon as the rear end of the comb frame passes beyond the dog or pawl 41, the latter will drop into position to engage the rear end of the top frame bar. The sides of the U-shape bar 40 beyond the dog or pawl 41, extend downward far enough to engage the top of the upper comb frame bar and act to prevent the comb frame leaving the lower guide.

For convenience in storage and transportation, the base bar 10 is preferably made in sections, and the sections joined together by metal plates 45 that overlap abutting portions of the frame bar and are secured thereto by screws or bolts.

It will be evident that my machine possesses the important qualities of simplicity, which is a factor contributing to its economical manufacture and sale, non-liability to get out of order, and not requiring special skill on the part of the operator; it needs no power mechanism to operate it, and yet its operation is not laborious; it is readily portable; and it performs the work required of it perfectly and in complete freedom from any objectionable incidents. My machine possesses all required provision for adjustment to suit frames of varying thickness and height. The knives may be easily removed and replaced when sharpening is required, or for other reasons.

It is of course to be understood that though I prefer that in the embodiment of my invention, the machine shall be constructed as I have herein illustrated and described it, nevertheless changes in construction may be made which will involve no departure in principle, and therefore machines of different construction may embody my invention.

Having thus described my invention, what I claim is—

1. A honey uncapping machine, having a stationary cutting means, and a guide for directing a comb frame past said cutting means, said cutting means consisting of a series of pointed knives arranged edge to edge.

2. A cutting mechanism for honey uncapping machines, comprising a series of knives arranged edge to edge, the edges being inclined, the cutting edge of one knife overlapping the surface traversed by the cutting edge of an adjacent knife.

3. A cutting mechanism for honey uncapping machines, comprising a series of cutting knives arranged edge to edge, each knife having two cutting edges which are of different lengths, and the knives being arranged with the long cutting edge of one knife contiguous to the short cutting edge of an adjacent knife.

4. A cutting mechanism for honey uncapping machines, comprising a series of knives arranged edge to edge, the cutting edge of one knife being separated by a space from a contiguous knife, said space being enlarged toward the knife shank.

5. A cutting mechanism for honey uncapping machines, comprising a series of knives, the knives being dished or concave on their sides next the honey comb, all points of the cutting edge lying in the same plane.

6. In a honey uncapping machine, the combination of cutting means, and a comb frame track or guide having frame-engaging ribs or flanges.

7. In a honey uncapping machine, the combination of cutting means, and a comb frame track or guide having frame-engaging ribs or flanges, said ribs or flanges being situated to engage the frame at three separated points.

8. In a honey uncapping machine, the combination of cutting means, and upper and lower comb frame guides or tracks, each having frame-engaging ribs or flanges.

9. In a honey uncapping machine, the combination of a base bar, parallel side frames, an adjustable knife-carrying bar mounted on each side frame, and a comb frame adjustable guide.

10. In a honey uncapping machine, the combination of a base bar, parallel side frames, an adjustable knife-carrying bar mounted on each side frame, comb frame guides between said frames, and adjustable bars clamped to said side frames supporting one of said guides.

11. In a honey uncapping machine, the combination of separated cutting means, a comb frame guiding means to guide a comb frame between said separated cutting means, and a comb frame moving device consisting of a reciprocating member above the cutting means and a frame engaging dog carried by said member.

12. Apparatus for uncapping honeycombs, comprising parallelly disposed rows of multiple cutters of triangular form adapted to remove wax from the lateral surfaces of the comb and uncap the cells, said rows being properly arranged and spaced to receive the combs between them.

13. Apparatus for uncapping honeycombs, comprising parallelly-disposed rows of multiple cutters of triangular form, each cutter being of concave form on the inner face and convex form on the outer sides and having two sharp angular beveled cutting edges, said rows being properly arranged and spaced to receive a honey-comb between them.

14. Apparatus for uncapping honeycombs, comprising parallelly-disposed rows of cutters arranged and spaced to receive a honey-comb between them, said cutters being of triangular form and having their edges rearwardly beveled and adapted to act on the lateral surfaces of the comb.

In testimony that I claim the foregoing I have hereunto set my hand.

LEWIS R. FERGUSON.

Witnesses:
 JOHN BELL,
 JOHN TIDMARSH.

---

Copies of this patent may be obtained for five cents each, by addressing the "Commissioner of Patents, Washington, D. C."